United States Patent [19]

Morgenstern et al.

[11] Patent Number: 4,784,492

[45] Date of Patent: Nov. 15, 1988

[54] DEVICE FOR DETERMINING SURFACE PROPORTION OF A PRINTED PATTERN FOR PRINTING MACHINES

[75] Inventors: Bernd Morgenstern, Lützschena; Helmut Weigend; Gudrun Dietrich, both of Leipzig, all of German Democratic Rep.

[73] Assignee: Veb Kombinat Polygraph "Werner Lamberz" Leipzig, Leipzig, German Democratic Rep.

[21] Appl. No.: 933,792

[22] Filed: Nov. 21, 1986

[30] Foreign Application Priority Data

Nov. 22, 1985 [DD] German Democratic Rep. .................................... 2831095

[51] Int. Cl.[4] ............................................... G01B 11/28

[52] U.S. Cl. ...................................... 356/379; 350/380

[58] Field of Search ............... 356/379, 380, 446, 445, 356/447, 448; 355/68

[56] References Cited

U.S. PATENT DOCUMENTS 3,621,268 11/1971 Friedrich et al. ............... 356/446 X 4,213,708 7/1980 Lucas ............................. 356/446 X

*Primary Examiner*—Gene Wan

*Attorney, Agent, or Firm*—Michael J. Striker

[57] ABSTRACT

A series of equidistant measuring heads is arranged at a uniform distance above a surface to be measured. Each head includes a light source emitting light through a narrow exit opening, and two light sensors arranged adjacent the opposite narrow sides of each opening. The light input characteristic of respective sensors is such that light reflected from the measured surface section is detected with a sensitivity which is inversely proportional to the different intensity of illumination of central and marginal points of the measured section.

5 Claims, 1 Drawing Sheet

DEVICE FOR DETERMINING SURFACE PROPORTION OF A PRINTED PATTERN FOR PRINTING MACHINES

BACKGROUND OF THE INVENTION

The present invention relates in general to printing and, in particular, to a device for detecting a proportion of printed surface on an original pattern for use in a printing machine. The detected value of the printed surface proportion is used for a preliminary adjustment of ink dosing operations of inking units of the printing machine.

A device for measuring the surface range of an image to be printed on an offset printing plate is known from the German publication DE-OS No. 30 29 273. This prior art device optically scans the printing plate by means of a photo-electric detecting device having the shape of a straight line. To illuminate the printing plate, there are provided two linear light sources arranged in parallel one to another. The light sources are equally spaced from the surface of the printing plate to be measured and light emitted from the light sources is deviated by lateral light screens to direct the light on a desired surface section or range.

This known arrangement produces more accurate measurements even in the case when the upper surface of the printing plate is not even. However, the disadvantage of the prior art device is in that the light sources illuminate also the surface ranges adjacent to the range under measurement and the marginal regions of the measured range are double illuminated from one side only. The resulting measuring error thus increases in the direction toward the rims of the printing plate. As a consequence, the determination of the presetting values for the ink metering is inaccurate and a loss in printing quality may occur.

SUMMARY OF THE INVENTION

It is, therefore, a general object of this invention to overcome the above disadvantages.

In particular, it is an object of this invention to provide an improved device for measuring the proportion of printed-on surface, which enables a higher measuring accuracy and an increased quality of printing.

In keeping with this object and others which will become apparent hereafter, one feature of this invention resides in the provision of means which prevent a nonuniform detection of light incident on the measured surface range, whereby a standard evaluation of all surface points in the measuring range is made possible.

According to the invention, the device includes a plurality of equidistant measuring units each consisting of at least two light sensors uniformly spaced above a measured surface and of a light source for illuminating with a maximum intensity a partial range of the surface measured, the distance of the sensors illuminated partial range being such as to produce a compensated or true evaluation of differently illuminated surface points within the measured surface, and the light sources in respective units being optically separated one from each other.

To reduce size of the measuring device, it is of advantage when the light sources are arranged in a row of equally spaced tubular housings each having a slot shaped light exit opening at its bottom, and the two sensors being mounted at opposite sides of respective light exit openings. Preferably, the sensors are arranged at opposite narrow sides of rectangular light exit openings.

Due to the juxtaposed arrangement of the sensors at the light exit opening, measuring errors caused by differences in illumination of the measured surface points are effectively compensated because the light input characteristics of the opposite sensors are inversely proportional to the radiation intensity of the assigned light source. The provision of a plurality of equidistant measuring units above the measured surface and the mutual separation of the light sources prevents the increase of a measuring error in the direction toward the rims of a measured printing plate.

The novel features which are considered as characteristic for the invention are set forth in the appended claims. The invention itself, however, both as to its construction and its method of operation, together with additional objects and advantages thereof, will be best understood from the following description of a specific embodiment when read in connection with the accompanying drawing.

DESCRIPTION OF THE PREFERRED EMBODIMENT

Figure 1:
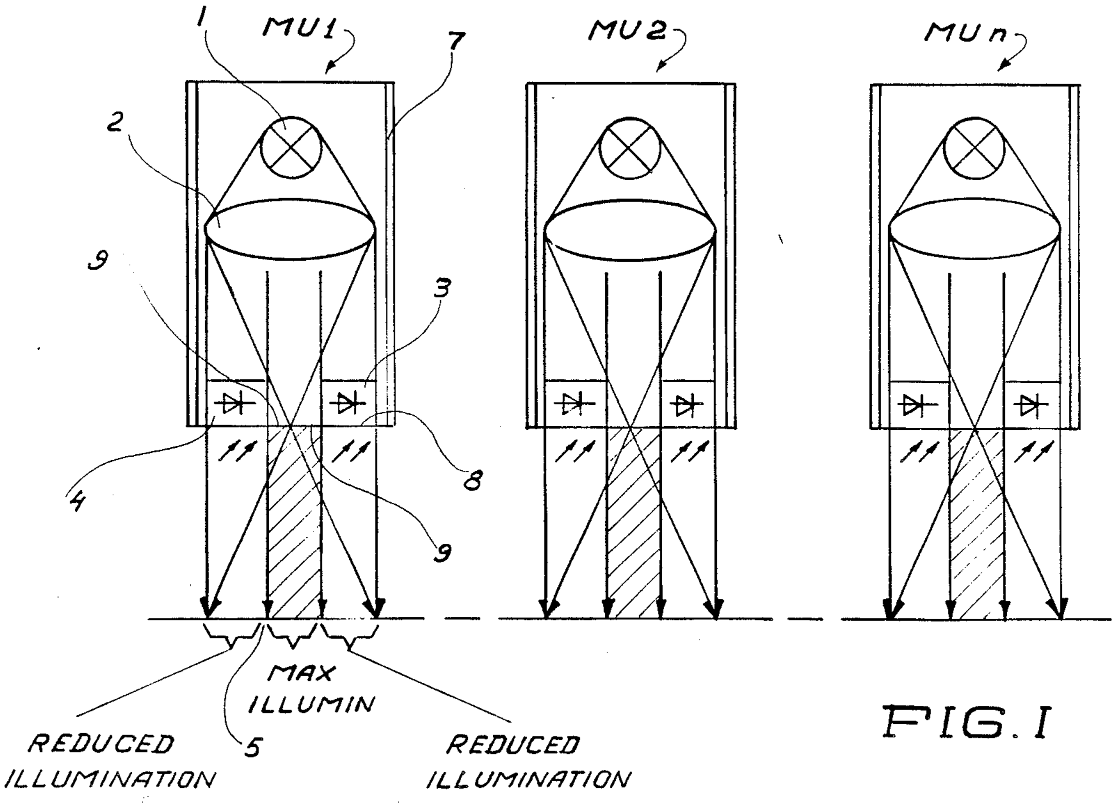
FIG. 1 is a schematic side view of the device of this invention.

The detecting device schematically illustrated in FIG. 1 includes a plurality of measuring units MU1, MU2, MUn arranged side by side at equal distances above an upper surface 6 of a printing plate to be measured. Each measuring unit includes a tubular housing 7 within the housing, a light source 1 and a lens system 2 for directing light emitted by the light source through a slot-shaped light exit opening 9 provided in the bottom of the housing. The exiting light beam illuminates a discrete section of the surface of a printing plate 6 which in the following description will be referred to as a measured surface range 5. Due to the elongated configuration of the exit opening 9, the measured surface points in the range 5 are illuminated with different intensities of radiation. The maximum radiation intensity is approximately in the central area indicated by hetching of each measuring range 5 while marginal areas are illuminated with a reduced intensity.

In order to obtain an equal evaluation of all measured surface points within the measuring range 5, each measuring unit includes two sensors in the form of photodiodes 3, 4 which are arranged relative to the illuminated range 5 in such a way that light of least intensity reflected from the marginal points of the surface range is detected with maximum sensitivity while light of maximum intensity at the center of measured surface is detected with least sensitivity.

With advantage, the two photodiodes are arranged opposite each other above the corresponding edges of the measuring range 5.

The spacing or clearance between the subsequent measuring ranges 5 is selected sufficiently large for preventing stray light exiting from adjacent measuring units from illuminating neighboring measured ranges.

Figure 2:
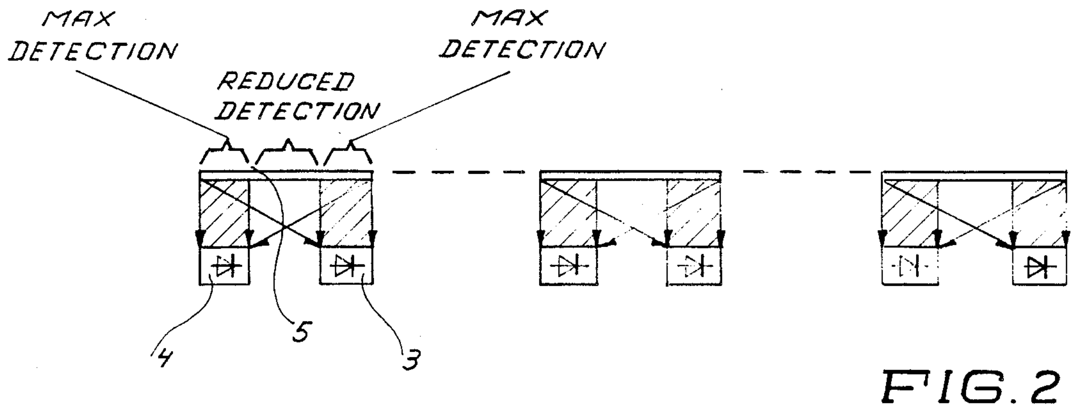
FIG. 2 is a schematic view of the arrangement of sensors in the device of FIG. 1.

In FIG. 2, dashed arrows indicate the directions of light rays reflected from measuring surface range 5 toward the photodiodes 3 and 4. It will be seen that rays from the marginal surface points of least illumination are detected at right angles to the input surface of the sensors, thus providing the maximum sensitivity of detection. Light reflected from the central region of maximum illumination of the range 5 is detected at a sharp angle to the input surface of respective diodes, thus causing a reduced sensitivity of detection.

The photodiodes 3 and 4 are located in recesses 8 in the bottom of each measuring unit near or adjacent to opposite sides of the light exit opening 9.

While the invention has been illustrated and described as embodied in a specific example of a print proportion determining device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A device for determining printed surface proportion on a pattern to be used in a printing machine, comprising at least one measuring unit including a light source arranged for illuminating with a high light intensity a central area of the printed surface and, with a reduced light intensity, marginal areas at opposite sides of said central area, at least two light sensors each arranged at equal distance above an assigned marginal area whereby the intensity of light reflection from said printed surface against said sensors is in inverse proportion to the different illumination intensities of said central and marginal areas.

2. A device as defined in claim 1 comprising a plurality of said measuring units arranged side-by-side above said printed surface to illuminate a series of separate surface sections, and the light sources in respective units being separated one from each other.

3. A device as defined in claim 2, wherein said measuring units are spaced apart about a uniform distance sufficient for preventing the entry of stray light from respective light sources into neighboring printed surface sections.

4. A device as defined in claim 1, wherein said light source is arranged in a housing defining an elongated light exit opening, and said sensors being arranged adjacent to opposite sides of said opening.

5. A device as defined in claim 4, wherein said opening is in the form of a narrow rectangular slot, and said sensors being arranged adjacent to narrow sides of said slot.

* * * * *